(12) United States Patent
Tagawa (10) Patent No.: US 10,046,657 B2
(45) Date of Patent: Aug. 14, 2018

(54) DRIVING DEVICE

(71) Applicant: TOYOTA JIDOSHA KABUSHIKI KAISHA, Toyota-shi, Aichi-ken (JP)

(72) Inventor: Yohsuke Tagawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/800,309

(22) Filed: Nov. 1, 2017

(65) Prior Publication Data
US 2018/0147946 A1    May 31, 2018

(30) Foreign Application Priority Data

Nov. 25, 2016  (JP) ................ 2016-228854

(51) Int. Cl.
| | | |
|---|---|---|
| H02M 3/158 | (2006.01) | |
| B60W 10/26 | (2006.01) | |
| B60L 11/18 | (2006.01) | |
| B60W 20/13 | (2016.01) | |
| B60K 6/445 | (2007.10) | |
| B60K 6/26 | (2007.10) | |

(52) U.S. Cl.
CPC ....... B60L 11/1812 (2013.01); B60L 11/1861 (2013.01); B60L 11/1868 (2013.01); B60W 10/26 (2013.01); B60W 20/13 (2016.01); B60K 6/26 (2013.01); B60K 6/445 (2013.01); B60L 2210/14 (2013.01); H02M 3/1584 (2013.01)

(58) Field of Classification Search
CPC ... H02M 2001/007; H02M 2001/0074; H02M 2001/0077; H02M 3/158; H02M 3/1584; B60K 6/26; B60K 6/445; B60W 10/26; B60W 20/13; B60L 11/1812; B60L 11/1861; B60L 11/1868; B60L 2210/14
See application file for complete search history.

(56) References Cited

U.S. PATENT DOCUMENTS

| | | | |
|---|---|---|---|
| 9,368,073 B2* | 6/2016 | Zhang | ................ G09G 3/3426 |
| 2010/0244789 A1* | 9/2010 | Osaka | ................ H02M 3/1584 |
| | | | 323/271 |

(Continued)

FOREIGN PATENT DOCUMENTS

| | | |
|---|---|---|
| JP | 2011-97693 | 5/2011 |
| JP | 2012-19587 | 1/2012 |

*Primary Examiner* — Jeffrey Gblende
*Assistant Examiner* — David A. Singh
(74) *Attorney, Agent, or Firm* — Finnegan, Henderson, Farabow, Garrett & Dunner, LLP (57) ABSTRACT

When the heat stress cumulative value of a second boost converter is equal to or greater than a second threshold value that is less than a first threshold value and the heat stress cumulative value of a first boost converter is less than a third threshold value that is equal to or less than the second threshold value, the first boost converter is controlled by voltage control and the second boost converter is controlled by power control. When the heat stress cumulative value of the first boost converter is equal to or greater than the second threshold value and the heat stress cumulative value of the second boost converter is less than the third threshold value, the first boost converter is controlled by the power control and the second boost converter is controlled by the voltage control.

4 Claims, 7 Drawing Sheets

(56) References Cited

U.S. PATENT DOCUMENTS

| | | | |
|---|---|---|---|
| 2010/0296204 A1* | 11/2010 | Ichikawa | B60K 6/445 |
| | | | 361/15 |
| 2011/0032733 A1* | 2/2011 | Watanabe | H02J 1/10 |
| | | | 363/21.14 |
| 2011/0188273 A1* | 8/2011 | Pansier | H02M 1/4225 |
| | | | 363/44 |
| 2012/0229114 A1* | 9/2012 | Yang | H02M 3/1584 |
| | | | 323/299 |
| 2012/0256561 A1* | 10/2012 | Kwon | H05B 33/0827 |
| | | | 315/307 |
| 2013/0076135 A1* | 3/2013 | Zhu | H02M 3/1584 |
| | | | 307/43 |
| 2014/0268908 A1* | 9/2014 | Zhou | H02M 7/5381 |
| | | | 363/21.03 |
| 2015/0256104 A1* | 9/2015 | Fu | H02M 7/537 |
| | | | 363/131 |
| 2015/0263644 A1* | 9/2015 | Fu | H02M 7/48 |
| | | | 363/95 |
| 2016/0344329 A1* | 11/2016 | Xu | H02P 6/12 |
| 2017/0129350 A1* | 5/2017 | Mitsutani | H02M 3/1584 |
| 2017/0243552 A1* | 8/2017 | Cao | G09G 3/3648 |

\* cited by examiner

DRIVING DEVICE

INCORPORATION BY REFERENCE

The disclosure of Japanese Patent Application No. 2016-228854 filed on Nov. 25, 2016 including the specification, drawings and abstract is incorporated herein by reference in its entirety.

BACKGROUND

1. Field of the Invention

The present disclosure relates to a driving device, and in particular, to a driving device including a motor, a power storage device, and two boost converters.

2. Description of Related Art

As this kind of driving device in the related art, a driving device has been proposed which includes a motor, a first power storage device, a first converter for exchanging power with voltage conversion between the first power storage device side and the motor side, a second power storage device, and a second converter for exchanging power with voltage conversion between the second power storage device side and the motor side and which controls the first converter by voltage control to adjust the voltage on the motor side to a target voltage and controls the second converter by power control to adjust the input/output power value of the second power storage device to a power command value (for example, refer to Japanese Unexamined Patent Application Publication No. 2011-97693 (JP 2011-97693 A)).

SUMMARY

In the first and second converters of the above-described driving device, heat stress is generated and accumulated due to repetition of temperature rise caused by generation of heat at the time of power application and temperature drop caused by cooling. In addition, when the degree of accumulation of heat stress of any one of the first and second converters becomes large enough to need protection of the converter, the allowable range of the converter may be limited. As a result, driving of the motor may be restricted. On the other hand, suppressing (moderating) an increase in the degree of accumulation of heat stress by stopping driving when it is possible to stop the driving of the converter before the degree of accumulation of heat stress becomes large enough to need protection of the converter can be considered. In the driving device described above, the second converter (converter controlled by the power control) may be controlled by arbitrarily setting the power command value. Therefore, stopping of driving can be easily performed. On the other hand, the first converter (converter controlled by the voltage control) needs to be controlled by setting the target voltage on the inverter side so that the output of the motor can be secured. For this reason, stopping of driving cannot be performed. Therefore, coping with an increase in the degree of accumulation of the heat stress of the first converter is difficult.

The disclosure provides a driving device for suppressing the restriction of driving of a motor by suppressing the limitation of the allowable range of any one of the two boost converters.

The driving device according to an aspect is as follows.

An aspect relates to a driving device including a motor, a power storage device, first and second boost converters, and an electronic control unit. The first and second boost converters are configured to exchange power by voltage conversion between the power storage device side and the motor side. The electronic control unit is configured to control one of the first and second boost converters by voltage control such that a voltage on the motor side becomes close to a first target voltage within an allowable range of the one boost converter and to control the other of the first and second boost converters by power control such that power exchanged between the power storage device side and the motor side through the other boost converter becomes close to a second target power within an allowable range of the other boost converter. The electronic control unit is configured to stop driving of the other boost converter when the second target power is within a predetermined range including a value zero to limit the allowable ranges of the first and second boost converters more when heat stress cumulative values of the first and second boost converters are equal to or greater than a first threshold value, than when the heat stress cumulative values of the first and second boost converters are less than the first threshold value. The electronic control unit is configured to execute a first control mode in which the first boost converter is controlled by the voltage control and the second boost converter is controlled by the power control when first conditions are satisfied in which the heat stress cumulative value of the second boost converter is equal to or greater than a second threshold value that is less than the first threshold value and the heat stress cumulative value of the first boost converter is less than a third threshold value that is equal to or less than the second threshold value. The electronic control unit is configured to execute a second control mode in which the first boost converter is controlled by the power control and the second boost converter is controlled by the voltage control when second conditions are satisfied in which the heat stress cumulative value of the first boost converter is equal to or greater than the second threshold value and the heat stress cumulative value of the second boost converter is less than the third threshold value.

With the driving device according to the aspect, when the first conditions are satisfied in which the heat stress cumulative value of the second boost converter is equal to or greater than the second threshold value that is less than the first threshold value and the heat stress cumulative value of the first boost converter is less than the third threshold value that is equal to or less than the second threshold value, the first control mode is executed in which the first boost converter is controlled by the voltage control and the second boost converter is controlled by the power control. When the second conditions are satisfied in which the heat stress cumulative value of the first boost converter is equal to or greater than the second threshold value and the heat stress cumulative value of the second boost converter is less than the third threshold value, the second control mode is executed in which the first boost converter is controlled by the power control and the second boost converter is controlled by the voltage control. In this manner, driving of one of the first and second converters, which has a heat stress cumulative value equal to or greater than the second threshold value of the first and second boost converters can be stopped. Accordingly, since the occurrence of a situation in which the heat stress cumulative value of the boost converter reaches or exceeds the first threshold value is suppressed (time until the heat stress cumulative value of the boost converter reaches or exceeds the first threshold value is increased), it is possible to suppress the allowable range of the boost converter from being limited (time until the allowable range of the boost converter is limited is increased). As a result, since the occurrence of a situation in which the allowable range of any one of the first and second boost converters is limited is suppressed (time until the allowable range of any one of the first and second boost converters is limited is increased), it is possible to suppress the driving of the motor from being restricted (time until the driving of the motor is restricted is increased). Here, the "power storage device" may be configured as one battery or one capacitor, or may be configured as two batteries or two capacitors. For example, in a case where the "power storage device" is one battery, the first and second boost converters exchange power with voltage conversion between the battery side and the motor side. In a case where the "power storage device" is two batteries, the first boost converter exchanges power with voltage conversion between the first battery side and the motor side, and the second boost converter exchanges power with voltage conversion between the second battery side and the motor side.

In the driving device according to the aspect, the electronic control unit may be configured to execute the first control mode or the second control mode in consideration of the efficiency of the driving device when neither the first conditions nor the second conditions are satisfied.

With the driving device according to the aspect, it is possible to improve the efficiency of the driving device when neither the first conditions nor the second conditions are satisfied.

In the driving device according to the aspect, the electronic control unit may be configured to calculate the heat stress cumulative value of the first boost converter based on the change history of the element temperature of the first boost converter and to calculate the heat stress cumulative value of the second boost converter based on the change history of the element temperature of the second boost converter.

With the driving device according to the aspect, it is possible to calculate the heat stress cumulative values of the first and second boost converters by integrating (accumulating) the difference between the maximum value and the minimum value of the element temperature, for example.

In the driving device according to the aspect, the electronic control unit may be configured to calculate a difference between a maximum value and a minimum value of the element temperature of the first boost converter from the change history of the element temperature of the first boost converter and to calculate the heat stress cumulative value of the first boost converter based on the difference and calculate the heat stress cumulative value of the second boost converter based on the change history of the element temperature of the second boost converter.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment will be described.

Figure 1:
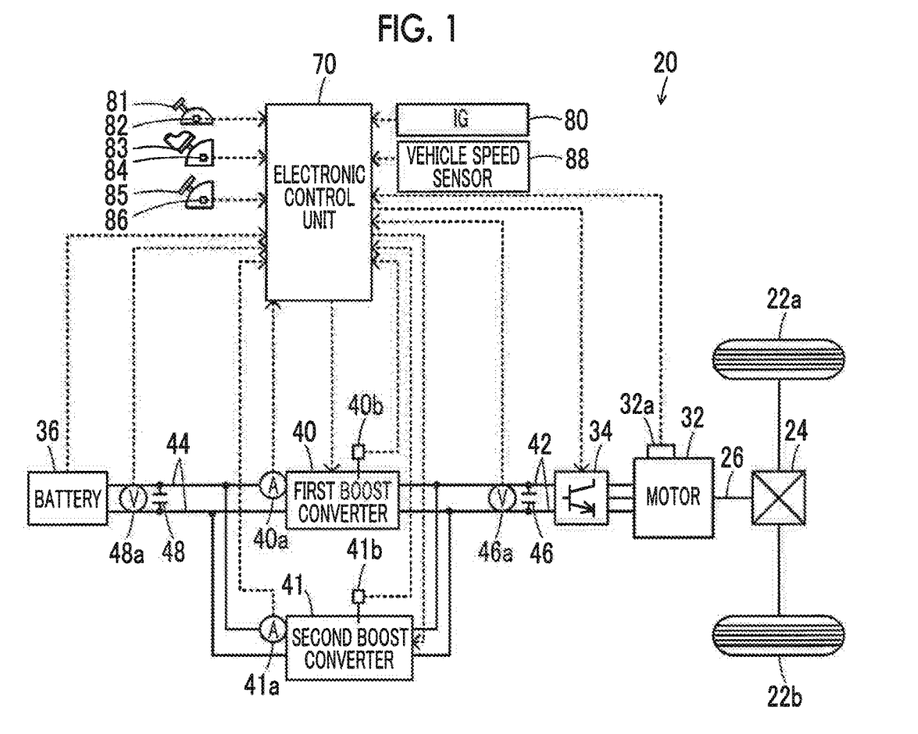
FIG. 1 is a schematic diagram showing the configuration of an electric vehicle in which a driving device as an embodiment is mounted.
Figure 2:
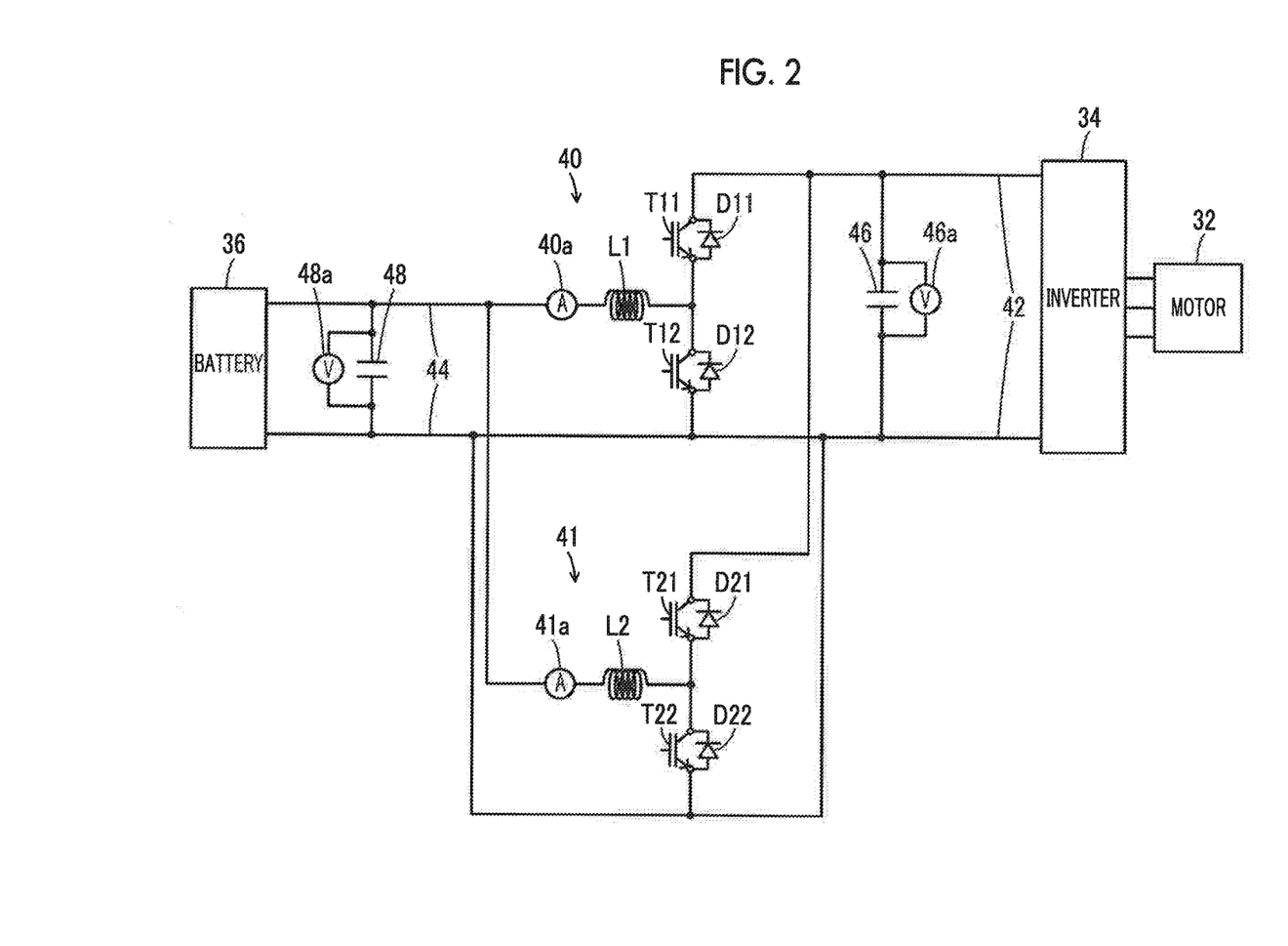
FIG. 2 is a schematic diagram showing the configuration of an electric driving system including a motor.

FIG. 1 is a schematic diagram showing the configuration of an electric vehicle 20 in which a driving device as an embodiment is mounted, and FIG. 2 is a schematic diagram showing the configuration of an electric driving system including a motor 32. As shown in FIG. 1, the electric vehicle 20 of the embodiment includes the motor 32, an inverter 34, a battery 36 as a power storage device, first and second boost converters 40, 41, and an electronic control unit 70. The motor 32, the battery 36, the first and second boost converters 40, 41, and the electronic control unit 70 correspond to a driving device of the embodiment.

The motor 32 is configured as, for example, a synchronous generator motor, and a rotor thereof is connected to a driving shaft 26 that is connected to driving wheels 22a, 22b through a differential gear 24. The inverter 34 is connected to the motor 32 and also connected to a high voltage side power line 42. The motor 32 is driven to rotate by performing switching control of a plurality of switching elements (not shown) of the inverter 34 by the electronic control unit 70. A smoothing capacitor 46 is connected to a positive side line and a negative side line of the high voltage side power line 42.

The battery 36 is configured, for example, as a lithium-ion secondary battery or a nickel hydrogen secondary battery, and is connected to a low voltage side power line 44 as a second power line. A smoothing capacitor 48 is connected to a positive side line and a negative side line of the low voltage side power line 44.

As shown in FIG. 2, the first boost converter 40 is connected to the high voltage side power line 42 and the low voltage side power line 44, and has two transistors T11, T12, two diodes D11, D12 connected in parallel in the reverse direction to the two transistors T11, T12, and a reactor L1. The transistor T11 is connected to the positive side line of the high voltage side power line 42. The transistor T12 is connected to the transistor T11 and the negative side lines of the high voltage side power line 42 and the low voltage side power line 44. The reactor L1 is connected to a connection point between the transistors T11, T12 and the positive side line of the low voltage side power line 44. By adjusting the ratio of the ON time between the transistors T11, T12 using the electronic control unit 70, the first boost converter 40 supplies the power of the low voltage side power line 44 to the high voltage side power line 42 according to a voltage rise, or supplies the power of the high voltage side power line 42 to the low voltage side power line 44 according to a voltage drop. Similarly to the first boost converter 40, the second boost converter 41 is connected to the high voltage side power line 42 and the low voltage side power line 44, and has two transistors T21, T22, two diodes D21, D22, and a reactor L2. By adjusting the ratio of the ON time between the transistors T21, T22 using the electronic control unit 70, the second boost converter 41 supplies the power of the low voltage side power line 44 to the high voltage side power line 42 according to a voltage rise, or supplies the power of the high voltage side power line 42 to the low voltage side power line 44 according to a voltage drop.

Although not shown, the electronic control unit 70 is configured as a microprocessor mainly using a CPU, and includes not only the CPU but also a ROM for storing a processing program or a RAM for temporarily storing data, a nonvolatile flash memory, and an input/output port. As shown in FIG. 1, signals from various sensors are input to the electronic control unit 70 through the input port. Examples of signals input to the electronic control unit 70 include a rotation position θm from a rotation position detection sensor 32a for detecting the rotation position of the rotor of the motor 32 and phase currents Iu and Iv from a current sensor for detecting a current flowing in each phase of the motor 32 A voltage Vb from a voltage sensor provided between the terminals of the battery 36 and a current Ib from a current sensor connected to the output terminal of the battery 36 can also be mentioned as examples of signals input to the electronic control unit 70. A voltage VH of the high voltage side power line 42 (capacitor 46) from a voltage sensor 46a provided between the terminals of the capacitor 46 and a voltage VL of the low voltage side power line 44 (capacitor 48) from a voltage sensor 48a provided between the terminals of the capacitor 48 can also be mentioned as examples of signals input to the electronic control unit 70. Currents IL1, IL2 of the reactors L1, L2 from current sensors 40a, 41a for detecting currents flowing through the reactors L1, L2 of the first and second boost converters 40, 41 and temperatures tc1, tc2 of the first and second boost converters 40, 41 from temperature sensors 40b, 41b connected to the first and second boost converters 40, 41 can also be mentioned as examples of signals input to the electronic control unit 70. An ignition signal from an ignition switch 80 and a shift position SP from a shift position sensor 82 for detecting the operation position of a shift lever 81 can also be mentioned as examples of signals input to the electronic control unit 70. An accelerator operation amount Acc from an accelerator pedal position sensor 84 for detecting the stepped amount on an accelerator pedal 83, a brake pedal position BP from a brake pedal position sensor 86 for detecting the stepped amount on a brake pedal 85, and a vehicle speed V from a vehicle speed sensor 88 can also be mentioned as examples of signals input to the electronic control unit 70. Various control signals are output from the electronic control unit 70 through the output port. Examples of signals output from the electronic control unit 70 include a switching control signal output to a plurality of switching elements of the inverter 34, a switching control signal output to the transistors T11, T12 of the first boost converter 40, and a switching control signal output to the transistors T21, T22 of the second boost converter 41. The electronic control unit 70 calculates an electrical angle θe of the motor 32 or the number of rotations Nm of the motor 32 based on the rotation position θm of the rotor of the motor 32 from the rotation position detection sensor 32a. The electronic control unit 70 calculates a power storage ratio SOC of the battery 36 based on the cumulative value of the current Ib of the battery 36 from the current sensor. The power storage ratio SOC is a ratio of the amount of power, which can be discharged from the battery 36, to the total capacity of the battery 36.

In the electric vehicle 20 of the embodiment configured as described above, first, the electronic control unit 70 sets request torque Tp* needed for traveling (needed for the driving shaft 26) based on the accelerator operation amount Acc and the vehicle speed V. Then, the set request torque Tp* is set as a torque command Tm* of the motor 32, and switching control of a plurality of switching elements of the inverter 34 is performed so that the motor 32 is driven by the torque command Tm*.

Figure 3:
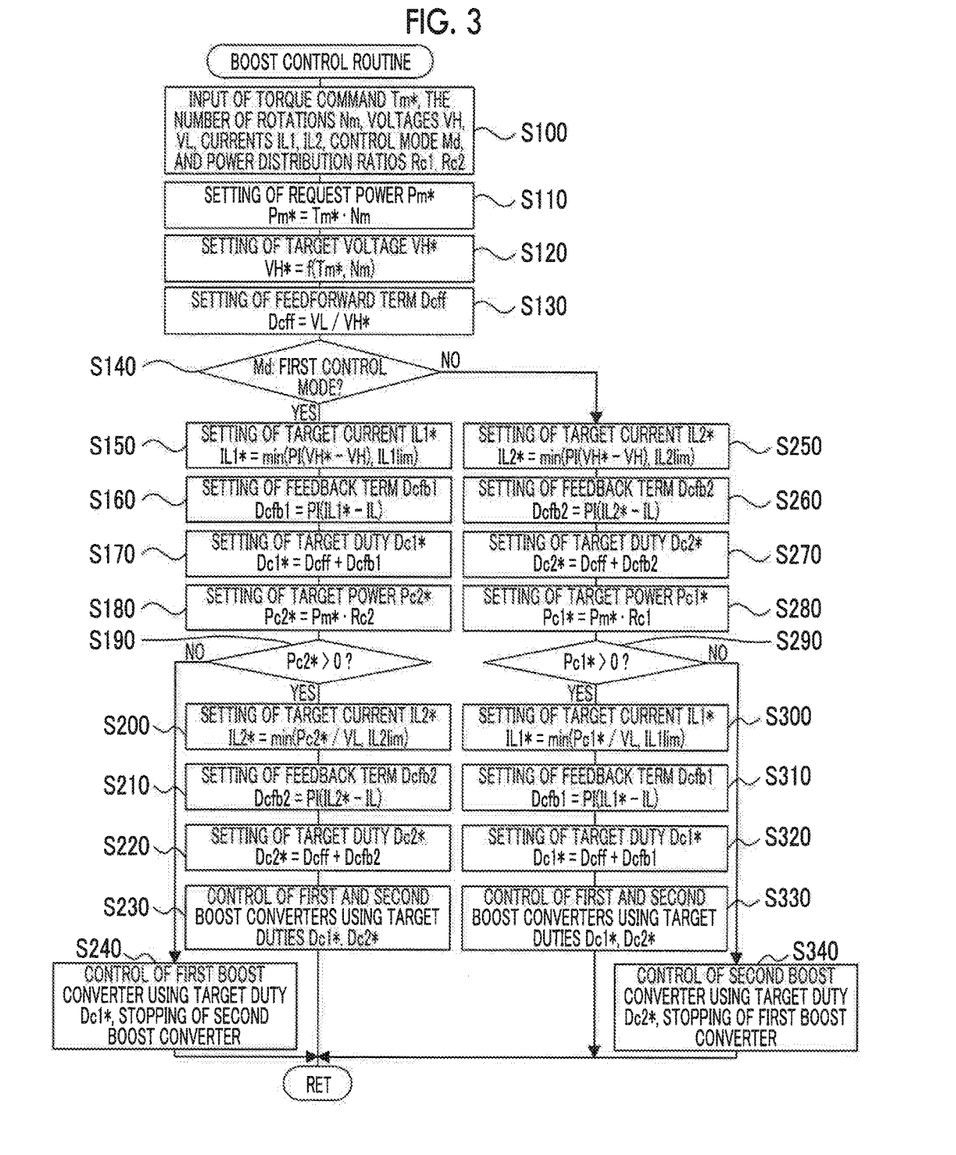
FIG. 3 is a flowchart showing an example of a boost control routine executed by an electronic control unit.

Next, the operation of the electric vehicle 20 of the embodiment configured as described above, in particular, the operation of the electric vehicle 20 when controlling the first and second boost converters 40, 41, will be described. FIG. 3 is a flowchart showing an example of a boost control routine executed by the electronic control unit 70. The boost control routine is repeatedly executed.

When the boost control routine shown in FIG. 3 is executed, first, the electronic control unit 70 receives data, such as the torque command Tm* of the motor 32 or the number of rotations Nm of the motor 32, the voltage VH of the high voltage side power line 42 (capacitor 46), the voltage VL of the low voltage side power line 44 (capacitor 48), the currents IL1, IL2 of the reactors L1, L2, a control mode Md, and power distribution ratios Rc1, Rc2 (Rc1+Rc2=1) of the first and second boost converters 40, 41 (step S100). Here, a value set based on the accelerator operation amount Acc and the vehicle speed V as described above is assumed to be input as the torque command Tm* of the motor 32. A value calculated based on the rotation position θm of the rotor of the motor 32 from the rotation position detection sensor 32a is assumed to be input as the number of rotations Nm of the motor 32. A value detected by the voltage sensor 46a is assumed to be input as the voltage VH of the high voltage side power line 42. A value detected by the voltage sensor 48a is assumed to be input as the voltage VL of the low voltage side power line 44. Values detected by the current sensors 40a, 41a are assumed to be input as the currents IL1, IL2 of the reactors L1, L2. Values set by a control mode setting routine (which will be described later) executed by the electronic control unit 70 are assumed to be input as the control mode Md and the power distribution ratios Rc1, Rc2 of the first and second boost converters 40, 41. In the embodiment, one of the first and second boost converters 40, 41 is controlled by voltage control to bring the voltage VH of the high voltage side power line 42 close to the target voltage within the allowable range of the one boost converter. The other of the first and second boost converters 40, 41 is controlled by power control to bring the power exchanged between the low voltage side power line 44 and the high voltage side power line 42 through the other boost converter close to the target power within the allowable range of the other boost converter. Hereinafter, the control mode Md in which the first boost converter 40 is controlled by voltage control and the second boost converter 41 is controlled by power control is referred to as a "first control mode". In addition, the control mode Md in which the second boost converter 41 is controlled by voltage control and the first boost converter 40 is controlled by power control is referred to as a "second control mode".

When data is input in this manner, a product of the input torque command Tm of the motor 32 and the input number of rotations Nm of the motor 32 is set as request power Pm* of the motor 32 (step S110), and a target voltage VH* of the high voltage side power line 42 is set based on the target operating point (torque command Tm and the number of rotations Nm) of the motor 32 (step S120). Here, the target voltage VH* of the high voltage side power line 42 is set to become higher as the torque command Tm* of the motor 32 becomes larger and to become higher as the number of rotations Nm of the motor 32 becomes larger so that the motor 32 can be driven at the target operating point.

Then, a value obtained by dividing the voltage VL of the low voltage side power line 44 by the target voltage VH* of the high voltage side power line 42 is set as a feedforward term Dcff of target duties Dc1*, Dc2* used in controlling the first and second boost converters 40, 41 (step S130).

Then, whether the control mode Md is the first control mode or the second control mode is determined (step S140). When the control mode Md is determined to be the first control mode, a value obtained by feedback control for making the voltage VH of the high voltage side power line 42 become the target voltage VH* is limited to an allowable current of the reactor L1 of the first boost converter 40, and a target current IL1* of the reactor L1 of the first boost converter 40 is set (step S150). Basically, a rated value is set as the allowable current IL1*lim* of the reactor L1. When a countermeasure for suppressing component failures of the first boost converter 40 is requested (when a heat stress cumulative value S1 to be described later reaches a threshold value Sref1 or more), a value that is sufficiently smaller than the rated value is set. Then, a feedback term Dcfb1 of the target duty Dc1* is set by feedback control for making the current IL1 of the reactor L1 of the first boost converter 40 become the target current IL1* (step S160). Then, a sum of the feedforward term Dcff and the feedback term Dcfb1 is set as the target duty Dc1* (step S170).

Then, a value obtained by multiplying the request power Pm* of the motor 32 by the power distribution ratio Rc2 of the second boost converter 41 is set as target power Pc2* exchanged between the low voltage side power line 44 and the high voltage side power line 42 through the reactor L2 (step S180). Then, whether or not the set target power Pc2* is larger than a value zero is determined (step S190).

When the target power Pc2* is larger than a value zero in step S190, a value obtained by dividing the target power Pc2* by the voltage VL of the low voltage side power line 44 is limited to an allowable current IL2*lim* of the reactor L2 of the second boost converter 41, and a target current IL2* of the reactor L2 of the second boost converter 41 is set (step S200). Basically, a rated value is set as the allowable current IL2*lim* of the reactor L2. When a countermeasure for suppressing component failures of the second boost converter 41 is requested (when a heat stress cumulative value S2 to be described later reaches the threshold value Sref1 or more), a value that is sufficiently smaller than the rated value is set. Then, a feedback term Dcfb2 of the target duty Dc2* is set by feedback control for making the current IL2 of the reactor L2 of the second boost converter 41 become the target current IL2* (step S210). A sum of the feedforward term Dcff and the feedback term Dcfb2 is set as the target duty Dc2* (step S220). Then, switching control of the transistors T11, T12, T21, T22 of the first and second boost converters 40, 41 is performed using the set target duties Dc1*, Dc2* (step S230), and the routine is ended.

When the target power Pc2* is a value zero in step S190, driving of the second boost converter 41 is stopped while performing switching control of the transistors T11, T12 of the first boost converter 40 using the target duty Dc1* (step S240), and the routine is ended.

When the control mode Md is determined to be the second control mode in step S140, a value obtained by feedback control for making the voltage VH of the high voltage side power line 42 become the target voltage VH* is limited to the allowable current IL2*lim* of the reactor L2 of the second boost converter 41, and the target current IL2* of the reactor L2 of the second boost converter 41 is set (step S250). Then, the feedback term Dcfb2 of the target duty Dc2* is set by feedback control for making the current IL2 of the reactor L2 of the second boost converter 41 become the target current IL2* (step S260). A sum of the feedforward term Dcff and the feedback term Dcfb2 is set as the target duty Dc2* (step S270).

Then, a value obtained by multiplying the request power Pm* of the motor 32 by the power distribution ratio Rc1 of the first boost converter 40 is set as target power Pc1* exchanged between the low voltage side power line 44 and the high voltage side power line 42 through the reactor L1 (step S280). Then, whether or not the set target power Pc1* is larger than a value zero is determined (step S290).

When the target power Pc1* is larger than a value zero in step S290, a value obtained by dividing the target power Pc1* by the voltage VL of the low voltage side power line 44 is limited to the allowable current IL1*lim* of the reactor L1 of the first boost converter 40, and the target current IL1* of the reactor L1 of the first boost converter 40 is set (step S300). Then, the feedback term Dcfb1 of the target duty Dc1* is set by feedback control for making the current IL1 of the reactor L1 of the first boost converter 40 become the target current IL1* (step S310). Then, a sum of the feedforward term Dcff and the feedback term Dcfb1 is set as the target duty Dc1* (step S320). Then, switching control of the transistors T11, T12, T21, T22 of the first and second boost converters 40, 41 is performed using the set target duties Dc1*, Dc2* (step S330), and the routine is ended.

When the target power Pc2* is a value zero in step S290, driving of the first boost converter 40 is stopped while performing switching control of the transistors T21, T22 of the second boost converter 41 using the target duty Dc2* (step S340), and the routine is ended.

Figure 4:
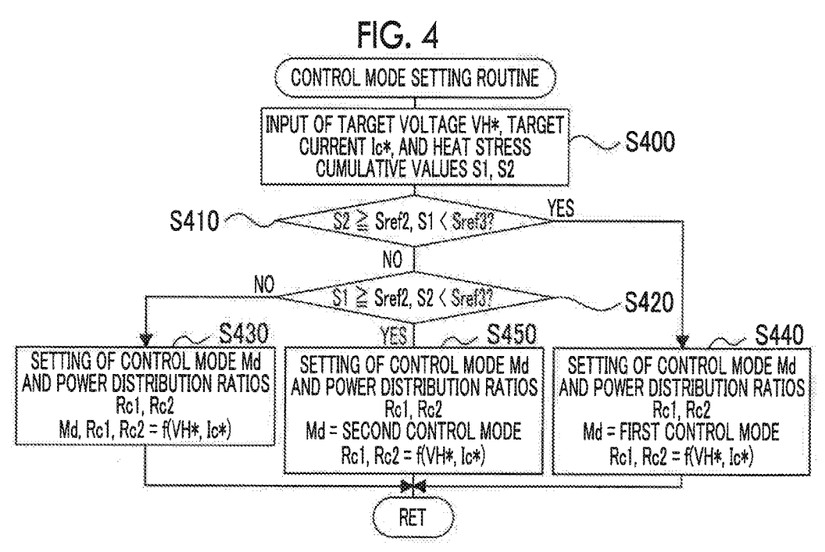
FIG. 4 is a flowchart showing an example of a control mode setting routine executed by the electronic control unit.

Next, processing for setting the control mode Md and the power distribution ratios Rc1, Rc2 of the first and second boost converters 40, 41 used in the boost control routine shown in FIG. 3 will be described. FIG. 4 is a flowchart showing an example of a control mode setting routine executed by the electronic control unit 70. The control mode setting routine is repeatedly executed in parallel with the boost control routine shown in FIG. 3.

Figure 5:
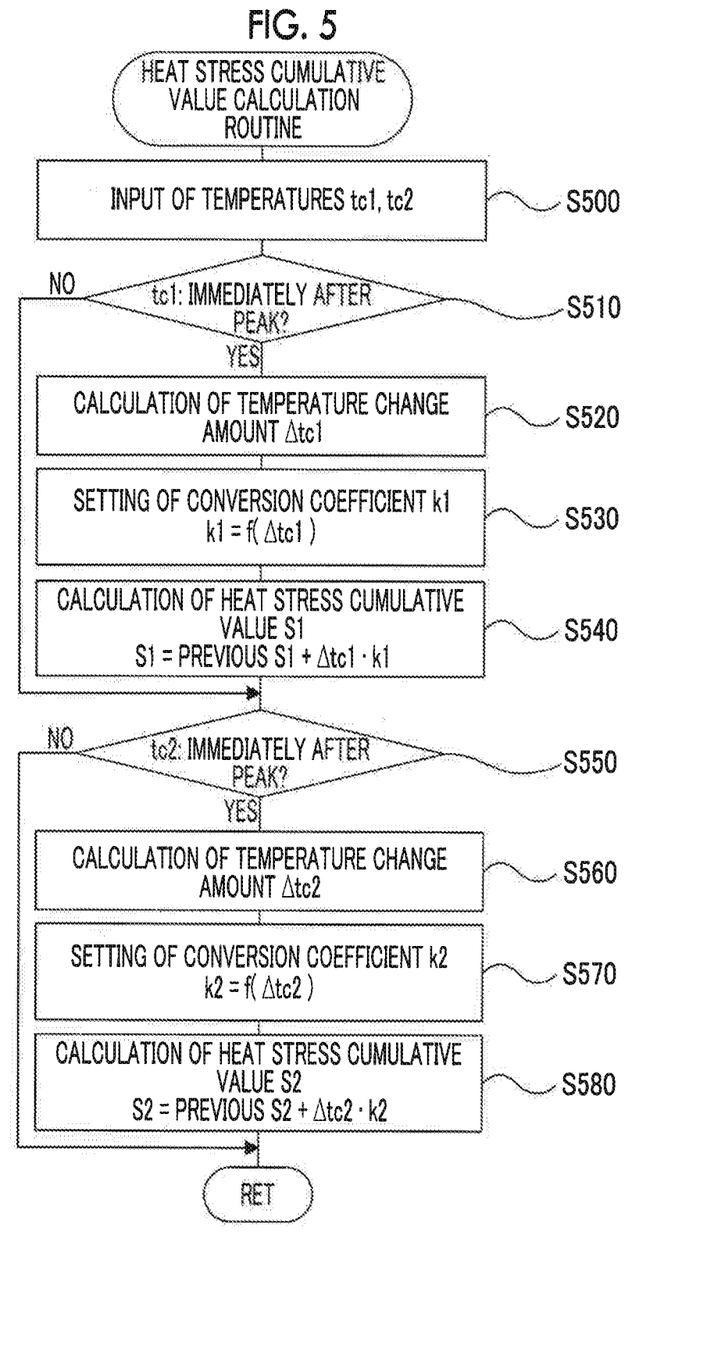
FIG. 5 is a flowchart showing an example of a heat stress cumulative value calculation routine executed by the electronic control unit.

When the control mode setting routine shown in FIG. 4 is executed, first, the electronic control unit 70 receives data, such as the target voltage VH* of the high voltage side power line 42, the target current Ic* exchanged between the low voltage side power line 44 and the high voltage side power line 42, and the heat stress cumulative values S1, S2 of the first and second boost converters 40, 41 (step S400). Here, a value set by the boost control routine shown in FIG. 3 is assumed to be input as the target voltage VH* of the high voltage side power line 42. The target current Ic* corresponds to a target value of the total current of the reactors L1, L2 of the first and second boost converters 40, 41, and a value obtained by dividing the request power Pm* of the motor 32 by the voltage VL of the low voltage side power line 44 is input as the target current Ic*. Values calculated by a heat stress cumulative value calculation routine shown in FIG. 5, which is executed by the electronic control unit 70, are assumed to be input as the heat stress cumulative values S1, S2 of the first and second boost converters 40, 41. Hereinafter, the description of the control mode setting routine shown in FIG. 4 is temporarily stopped, and the heat stress cumulative value calculation routine shown in FIG. 5 will be described. The heat stress cumulative value calculation routine shown in FIG. 5 is repeatedly executed in parallel with the boost control routine shown in FIG. 3 or the control mode setting routine shown in FIG. 4. As the heat stress cumulative values S1, S2 of the first and second boost converters 40, 41, a value zero is set at the time of shipping or when the first and second boost converters 40, 41 are exchanged.

When the heat stress cumulative value calculation routine shown in FIG. 5 is executed, the electronic control unit 70 receives the temperatures tc1, tc2 of the first and second boost converters 40, 41 from the temperature sensors 40b, 41b (step S500). The electronic control unit 70 determines whether or not the temperature tc1 of the first boost converter 40 has just reached a peak value (a maximum value or a minimum value) using the history of the input temperature tc1 of the first boost converter 40 (step S510).

Figure 6:
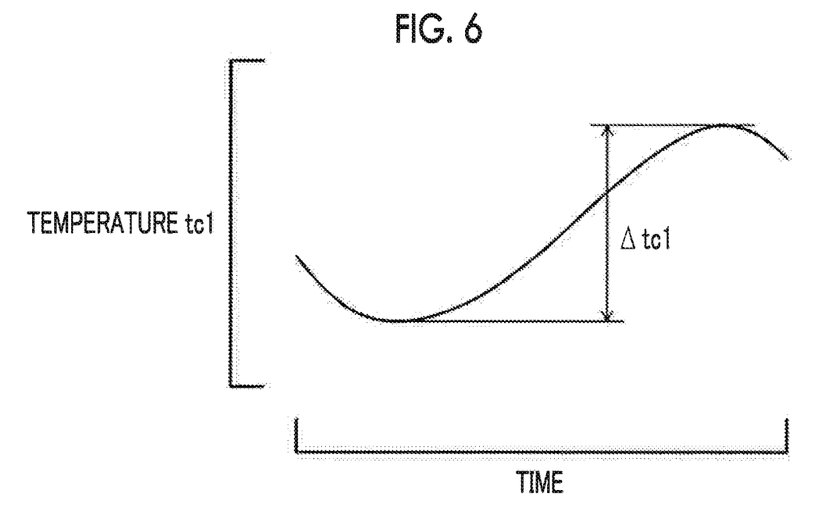
FIG. 6 is an explanatory diagram showing an example of a method of setting the temperature change amount of a first boost converter.

When the electronic control unit 70 determines that the temperature tc1 of the first boost converter 40 has just reached the peak value, the electronic control unit 70 sets a difference between the peak value and a peak value (for example, a minimum value) immediately before the peak value as a temperature change amount Δtc1 of the first boost converter 40 (step S520). FIG. 6 shows an example of a method of setting the temperature change amount Δtc1 of the first boost converter 40. Then, a conversion coefficient k1 is set based on the set temperature change amount Δtc1 of the first boost converter 40 (step S530). Here, the conversion coefficient k1 is stored in advance in a ROM (not shown) as a map by determining the relationship between the temperature change amount Δtc1 and the conversion coefficient k1. When the temperature change amount Δtc1 is given, a corresponding conversion coefficient k1 is derived from the map and is set. As the conversion coefficient k1, a uniform value may be used.

Then, the heat stress cumulative value S1 of the first boost converter 40 is updated by adding a value, which is obtained by multiplying the temperature change amount Δtc1 by the conversion coefficient k1, to the previous value of the heat stress cumulative value S1 of the first boost converter 40 (step S540). In this manner, the heat stress cumulative value S1 of the first boost converter 40 can be calculated. When the electronic control unit 70 determines that the temperature tc1 of the first boost converter 40 has not reached the peak value in step S510, the processing of steps S520 to S540 is not executed.

Then, the electronic control unit 70 determines whether or not the temperature tc2 of the second boost converter 41 has just reached a peak value using the history (about several values) of the temperature tc2 of the second boost converter 41 (step S550). When the electronic control unit 70 determines that the temperature tc2 of the second boost converter 41 has just reached the peak value, the electronic control unit 70 sets a difference between the peak value (for example, a maximum peak value) and a peak value (for example, a minimum value) immediately before the peak value as a temperature change amount Δtc2 of the second boost converter 41 (step S560). Then, a conversion coefficient k2 is set based on the set temperature change amount Δtc2 of the second boost converter 41 (step S570). As the conversion coefficient k2, a uniform value can be used, similarly to the conversion coefficient k1.

Then, the heat stress cumulative value S2 of the second boost converter 41 is updated by adding a value, which is obtained by multiplying the temperature change amount Δtc2 by the conversion coefficient k2, to the previous value of the heat stress cumulative value S2 of the second boost converter 41 (step S580), and the routine is ended. In this manner, the heat stress cumulative value S2 of the second boost converter 41 can be calculated. When the electronic control unit 70 determines that the temperature tc2 of the second boost converter 41 has not reached the peak value in step S550, the routine is ended without executing the processing of steps S560 to S580.

The control mode setting routine shown in FIG. 4 will be described again. When the heat stress cumulative values S1, S2 of the first and second boost converters 40, 41 are input in step S400, the electronic control unit 70 determines whether or not first conditions, in which the heat stress cumulative value S2 of the second boost converter 41 is equal to or greater than a threshold value Sref2 that is less than the threshold value Sref1 and the heat stress cumulative value S1 of the first boost converter 40 is less than a threshold value Sref3 that is equal to or less than the threshold value Sref2, are satisfied (step S410). Then, the electronic control unit 70 determines whether or not second conditions, in which the heat stress cumulative value S1 of the first boost converter 40 is equal to or greater than the threshold value Sref2 and the heat stress cumulative value S2 of the second boost converter 41 is less than the threshold value Sref3, are satisfied (step S420). Here, the threshold value Sref1 is a value requesting a countermeasure for suppressing component failures of the first and second boost converters 40, 41 (value for setting the allowable currents IL1lim, IL2lim of the reactors L1, L2 to values sufficiently smaller than the rated value). As the threshold value Sref2, for example, values of 85%, 90%, and 95% of the threshold value Sref1 can be used. As the threshold value Sref3, for example, values of 70%, 75%, and 80% of the threshold value Sref1 can be used.

When the electronic control unit 70 determines that neither the first conditions nor the second conditions are satisfied in steps S410 and S420, the control mode Md and the power distribution ratios Rc1, Rc2 of the first and second boost converters 40, 41 are set based on the target voltage VH* and the target current Ic* of the high voltage side power line 42 (step S430), and the routine is ended.

As "when neither the first conditions nor the second conditions are satisfied", "when both the heat stress cumulative values S1, S2 of the first and second boost converters 40, 41 are less than the threshold value Sref2" or "when one of the heat stress cumulative values S1, S2 is equal to or greater than the threshold value Sref2 and the other of the heat stress cumulative values S1, S2 is equal to or greater than the threshold value Sref3" can be mentioned.

Figure 7:
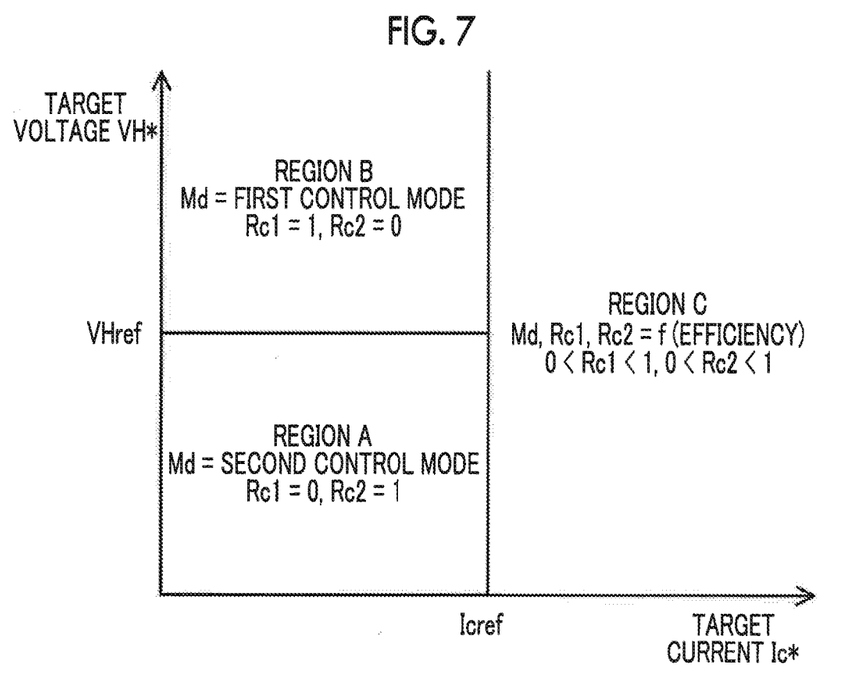
FIG. 7 is an explanatory diagram showing an example of the relationship among the target voltage and the target current of the high voltage side power line, a control mode, and a power distribution ratio between first and second boost converters.

In the embodiment, the control mode Md and the power distribution ratios Rc1, Rc2 of the first and second boost converters 40, 41 are stored in advance in a ROM (not shown) as a map by determining the relationship between the target voltage VH* and the target current Ic* of the high voltage side power line 42 and the control mode Md and the power distribution ratios Rc1, Rc2 of the first and second boost converters 40, 41, When the target voltage VH* and the target current Ic* of the high voltage side power line 42 are given, the corresponding control mode Md and the corresponding power distribution ratios Rc1, Rc2 of the first and second boost converters 40, 41 are set from the map. FIG. 7 shows an example of the map. In the example shown in FIG. 7, for a region A where the target voltage VH* of the high voltage side power line 42 is less than a threshold value VHref and the target current Ic* of the high voltage side power line 42 is less than a threshold value Icref, the second control mode is set as the control mode Md, and values zero and one are set as the power distribution ratios Rc1, Rc2 of the first and second boost converters 40, 41, respectively. For a region B where the target voltage VH* of the high voltage side power line 42 is equal to or greater than the threshold value VHref and the target current Ic* of the high voltage side power line 42 is less than the threshold value Icref, the first control mode is set as the control mode Md, and values one and zero are set as the power distribution ratios Rc1, Rc2 of the first and second boost converters 40, 41, respectively. For a region C where the target current Ic* is equal to or greater than the threshold value Icref, the control mode Md and the power distribution ratios Rc1, Rc2 (0<Rc1<1, 0<Rc2<1) of the first and second boost converters 40, 41 are set in consideration of the efficiency of the driving device (so as to minimize the loss of the driving device). Accordingly, in the region A, the second boost converter 41 is driven in the second control mode by the boost control routine shown in FIG. 3, and the driving of the first boost converter 40 is stopped. In the region B, the first boost converter 40 is driven in the first control mode by the boost control routine shown in FIG. 3, and the driving of the second boost converter 41 is stopped. In the region C, both the first and second boost converters 40, 41 are driven in the first control mode or the second control mode by the boost control routine shown in FIG. 3. In FIG. 7, a method of setting the control mode Md and the power distribution ratios Rc1, Rc2 in each region or a region division method (including the number of regions) is solely exemplified, and is appropriately set according to the specification of the first and second boost converters 40, 41.

When the electronic control unit 70 determines that the first conditions are satisfied in step S410, the first control mode is set as the control mode Md and the power distribution ratios Rc1, Rc2 of the first and second boost converters 40, 41 are set based on the target voltage VH* and the target current Ic* of the high voltage side power line 42 (step S440), and the routine is ended. In the embodiment, the power distribution ratios Rc1, Rc2 of the first and second boost converters 40, 41 are set using the same map as in FIG. 7. For example, for the regions A, B, values one and zero are set as the power distribution ratios Rc1, Rc2 of the first and second boost converters 40, 41, respectively. For the region C, the power distribution ratios Rc1, Rc2 (0<Rc1<1, 0<Rc2<1) of the first and second boost converters 40, 41 are set in consideration of the efficiency of the driving device (so as to minimize the loss of the driving device). Accordingly, in the regions A, B, the first boost converter 40 is driven in the first control mode by the boost control routine shown in FIG. 3, and the driving of the second boost converter 41 is stopped. In the region C, both the first and second boost converters 40, 41 are driven in the first control mode by the boost control routine shown in FIG. 3.

When the electronic control unit 70 determines that the second conditions are satisfied in step S420, the second control mode is set as the control mode Md and the power distribution ratios Rc1, Rc2 of the first and second boost converters 40, 41 are set based on the target voltage VH* and the target current Ic* of the high voltage side power line 42 (step S450), and the routine is ended. In the embodiment, the power distribution ratios Rc1, Rc2 of the first and second boost converters 40, 41 are set using the same map as in FIG. 7. For example, for the regions A, B, the power distribution ratios Rc1, Rc2 of the first and second boost converters 40, 41 are set to values zero and one, respectively. In addition, for the region C, the power distribution ratios Rc1, Rc2 (0<Rc1<1, 0<Rc2<1) of the first and second boost converters 40, 41 are set in consideration of the efficiency of the driving device (so as to minimize the loss of the driving device). Accordingly, in the regions A, B, the second boost converter 41 is driven in the second control mode by the boost control routine shown in FIG. 3, and the driving of the first boost converter 40 is stopped. In the region C, both the first and second boost converters 40, 41 are driven in the second control mode by the boost control routine shown in FIG. 3.

In the driving device provided in the electric vehicle 20 of the embodiment, heat stress is generated and accumulated (heat stress cumulative values S1, S2 increase) in the first and second boost converters 40, 41 due to repetition of temperature rise caused by generation of heat at the time of power application and temperature drop caused by cooling. Therefore, when the heat stress cumulative value S1 of the first boost converter 40 reaches or exceeds the threshold values Sref1, the allowable current IL1*lim* of the reactor L1 of the first boost converter 40 is limited to a value sufficiently smaller than the rated value. In addition, when the heat stress cumulative value S2 of the second boost converter 41 reaches or exceeds the threshold values Sref1, the allowable current IL2*lim* of the reactor L2 of the second boost converter 41 is limited to a value sufficiently smaller than the rated value. Due to the allowable currents IL1*lim*, IL2*lim* of the first and second boost converters 40, 41, driving of the motor 32 may be restricted (traveling performance may deteriorate). On the other hand, moderating an increase in the heat stress cumulative value by stopping driving when stopping the driving of the first and second boost converters 40, 41 is possible before the heat stress cumulative values S1, S2 of the first and second boost converters 40, 41 reach or exceed the threshold value Sref1 can be considered A boost converter controlled by the power control (hereinafter, referred to as a "power control side converter") of the first and second boost converters 40, 41 may be controlled by arbitrarily setting the power distribution ratio Rc ("Rc1" or "Rc2") and accordingly the target power Pc* ("Pc1*" or "Pc2*"). Therefore, stopping the driving can be easily performed. On the other hand, a boost converter controlled by the voltage control (hereinafter, referred to as a "voltage control side converter") of the first and second boost converters 40, 41 needs to be controlled by setting the target voltage VH* of the high voltage side power line 42 so that the target power Pm* of the motor 32 can be secured. For this reason, stopping the driving cannot be performed. Specific reasons are as follows. Power exchanged between the low voltage side power line 44 and the high voltage side power line 42 through the voltage control side converter (hereinafter, referred to as "voltage control side power") corresponds to the difference between the power consumption of the motor 32 and power exchanged between the low voltage side power line 44 and the high voltage side power line 42 through the current control side converter (hereinafter, referred to as "power control side power"). The voltage VH of the high voltage side power line 42 changes due to the voltage control side power. Assuming that the driving of the voltage control side converter is to be stopped, the voltage control side power needs to be maintained at a value zero in order to maintain the voltage VH of the high voltage side power line 42. However, it is difficult to accurately estimate the power consumption of the motor 32 due to a detection error of the number of rotations Nm of the motor 32 or the like. Therefore, it is difficult to control the power control side converter so that the voltage control side power becomes a value zero. For this reason, continuously driving the voltage control side converter (not to stop the driving) is needed.

Based on this, in the embodiment, control is performed as follows. When the first conditions are satisfied in which the heat stress cumulative value S2 of the second boost converter 41 is equal to or greater than the threshold value Sref2 and the heat stress cumulative value S1 of the first boost converter 40 is less than the threshold value Sref3, the first control mode is executed in which the first boost converter 40 is controlled by the voltage control and the second boost converter 41 is controlled by the power control. When the second conditions are satisfied in which the heat stress cumulative value S1 of the first boost converter 40 is equal to or greater than the threshold value Sref2 and the heat stress cumulative value S2 of the second boost converter 41 is less than the threshold value Sref3, the second control mode is executed in which the second boost converter 41 is controlled by the voltage control and the first boost converter 40 is controlled by the power control. In this manner, driving of one of the first and second boost converters 40, 41, which has a heat stress cumulative value larger than the threshold value Sref2 of can be stopped. Accordingly, since the occurrence of a situation in which the heat stress cumulative value of the boost converter reaches or exceeds the threshold value Sref1 is suppressed (time until the heat stress cumulative value of the boost converter reaches or exceeds the threshold value Sref1 is increased), it is possible to suppress the allowable current of the boost converter from being restricted (time until the allowable current of the boost converter is restricted is increased). As a result, since the occurrence of a situation in which the allowable current of any one of the first and second boost converters 40, 41 is restricted is suppressed (time until the allowable current of any one of the first and second boost converters 40, 41 is restricted is increased), it is possible to suppress the driving of the motor 32 from being restricted (time until the driving of the motor 32 is restricted is increased).

In the driving device provided in the electric vehicle 20 of the embodiment described above, when the first conditions are satisfied in which the heat stress cumulative value S2 of the second boost converter 41 is equal to or greater than the threshold value Sref2 and the heat stress cumulative value S1 of the first boost converter 40 is less than the threshold value Sref3, the first control mode is executed in which the first boost converter 40 is controlled by the voltage control and the second boost converter 41 is controlled by the power control. When the second conditions are satisfied in which the heat stress cumulative value S1 of the first boost converter 40 is equal to or greater than the threshold value Sref2 and the heat stress cumulative value S2 of the second boost converter 41 is less than the threshold value Sref3, the second control mode is executed in which the second boost converter 41 is controlled by the voltage control and the first boost converter 40 is controlled by the power control. Therefore, since the occurrence of a situation in which the allowable current of any one of the first and second boost converters 40, 41 is restricted is suppressed (time until the allowable current of any one of the first and second boost converters 40, 41 is restricted is increased), it is possible to suppress the driving of the motor 32 from being restricted (time until the driving of the motor 32 is restricted is increased).

In the driving device provided in the electric vehicle 20 of the embodiment, driving of a boost converter controlled by the power control of the first and second boost converters 40, 41 is stopped when the target power Pc* ("Pc1*" or "Pc2*") is a value zero. However, the driving of a boost converter controlled by the power control of the first and second boost converters 40, 41 may be stopped when the absolute value of the target power Pc* is equal to or less than a threshold value Pcref that is slightly larger than the value zero.

In the driving device provided in the electric vehicle 20 of the embodiment, the first and second boost converters 40, 41 are controlled by setting the sum of the feedforward term Dcff and the feedback terms Dcfb1, Dcfb2 to the target duties Dc1*, Dc2*. However, the first and second boost converters 40, 41 may be controlled by setting the feedback terms Dcfb1, Dcfb2 to the target duties Dc1*, Dc2* without using the feedforward term Dcff.

Figure 8:
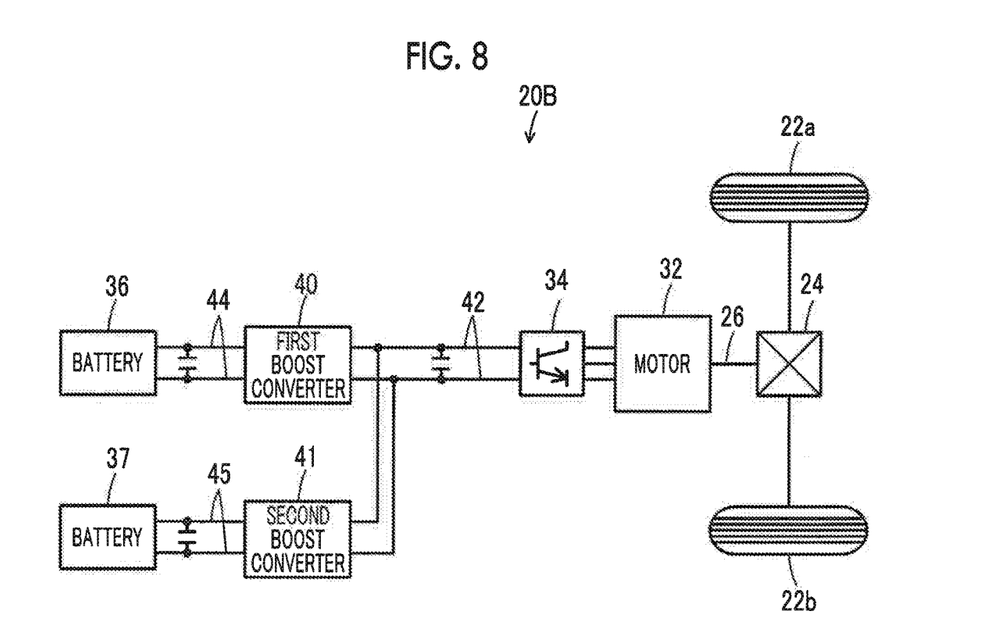
FIG. 8 is a schematic diagram showing the configuration of an electric vehicle according to a modification example.

In the electric vehicle 20 of an embodiment, one battery 36 is provided as a power storage device, and the first and second boost converters 40, 41 are provided between the low voltage side power line 44 to which the battery 36 is connected and the high voltage side power line 42 to which the inverter 34 is connected. However, as shown in an electric vehicle 20B according to a modification example in FIG. 8, two batteries 36, 37 may be provided as power storage devices, and the first boost converter 40 may be provided between the low voltage side power line 44 to which the battery 36 is connected and the high voltage side power line 42 to which the inverter 34 is connected and the second boost converter 41 may be provided between a low voltage side power line 45 to which the battery 37 is connected and the high voltage side power line 42. In the electric vehicle 20, a capacitor may be used as a power storage device instead of the battery 36. In the electric vehicle 20B, two capacitors may be used as power storage devices instead of the batteries 36, 37.

In the embodiment, a form of a driving device mounted in the electric vehicle 20 that travels using the power from the motor 32 is adopted. However, a form of a driving device mounted in a hybrid vehicle that travels using the power from the motor and the power from the engine may be adopted, or a form of a driving device provided in a non-moving facility, such as construction equipment, may be adopted.

The correspondence between the main elements of the embodiment and the main elements described in "SUMMARY" will be described. In the embodiment, the motor 32 corresponds to a "motor", the battery 36 corresponds to a "power storage device", the first and second boost converters 40, 41 correspond to "first and second boost converters", and the electronic control unit 70 corresponds to a "control device".

The correspondence between the main elements of the embodiment and the main elements described in "SUMMARY " is an example for specifically describing "DETAILED DESCRIPTION OF EMBODIMENTS" of which embodiments are described in "SUMMARY", and does not limit the elements described in "SUMMARY". That is, the interpretation of the aspect described in "SUMMARY" should be made based on the description in "SUMMARY", and the embodiment is just a specific example described in "SUMMARY".

While an embodiment has been described, the disclosure is not limited to such an embodiment, and can be carried out in various forms.

The embodiment can be used in the manufacturing industry of a driving device and the like.

What is claimed is:
1. A driving device comprising:
a motor;
a power storage device;

first and second boost converters configured to exchange power by voltage conversion between a voltage on a power storage device side and a voltage on a motor side; and an electronic control unit configured to control one of the first and second boost converters by voltage control such that the voltage on the motor side becomes close to a target voltage within an allowable range of the one boost converter and to control the other of the first and second boost converters by power control such that power exchanged between the power storage device side and the motor side through the other boost converter becomes close to target power within an allowable range of the other boost converter, wherein:

the electronic control unit is configured to stop driving of the other boost converter when the target power is within a predetermined range including a value zero to limit the allowable ranges of the first and second boost converters more when heat stress cumulative values of the first and second boost converters are equal to or greater than a first threshold value, than when the heat stress cumulative values of the first and second boost converters are less than the first threshold value;

the electronic control unit is configured to execute a first control mode in which the first boost converter is controlled by the voltage control and the second boost converter is controlled by the power control when first conditions are satisfied in which the heat stress cumulative value of the second boost converter is equal to or greater than a second threshold value that is less than the first threshold value and the heat stress cumulative value of the first boost converter is less than a third threshold value that is equal to or less than the second threshold value; and the electronic control unit is configured to execute a second control mode in which the first boost converter is controlled by the power control and the second boost converter is controlled by the voltage control when second conditions are satisfied in which the heat stress cumulative value of the first boost converter is equal to or greater than the second threshold value and the heat stress cumulative value of the second boost converter is less than the third threshold value.

2. The driving device according to claim 1, wherein the electronic control unit is configured to execute the first control mode or the second control mode in consideration of efficiency of the driving device when neither the first conditions nor the second conditions are satisfied.

3. The driving device according to claim 1, wherein the electronic control unit is configured to calculate the heat stress cumulative value of the first boost converter based on a first change history of element temperature of the first boost converter and to calculate the heat stress cumulative value of the second boost converter based on a second change history of element temperature of the second boost converter.

4. The driving device according to claim 3, wherein the electronic control unit is configured to calculate a difference between a maximum value and a minimum value of the element temperature of the first boost converter from the first change history of the element temperature of the first boost converter; and the electronic control unit is configured to calculate the heat stress cumulative value of the first boost converter based on the difference and calculate the heat stress cumulative value of the second boost converter based on the second change history of the element temperature of the second boost converter.

* * * * *